Patented July 14, 1925.

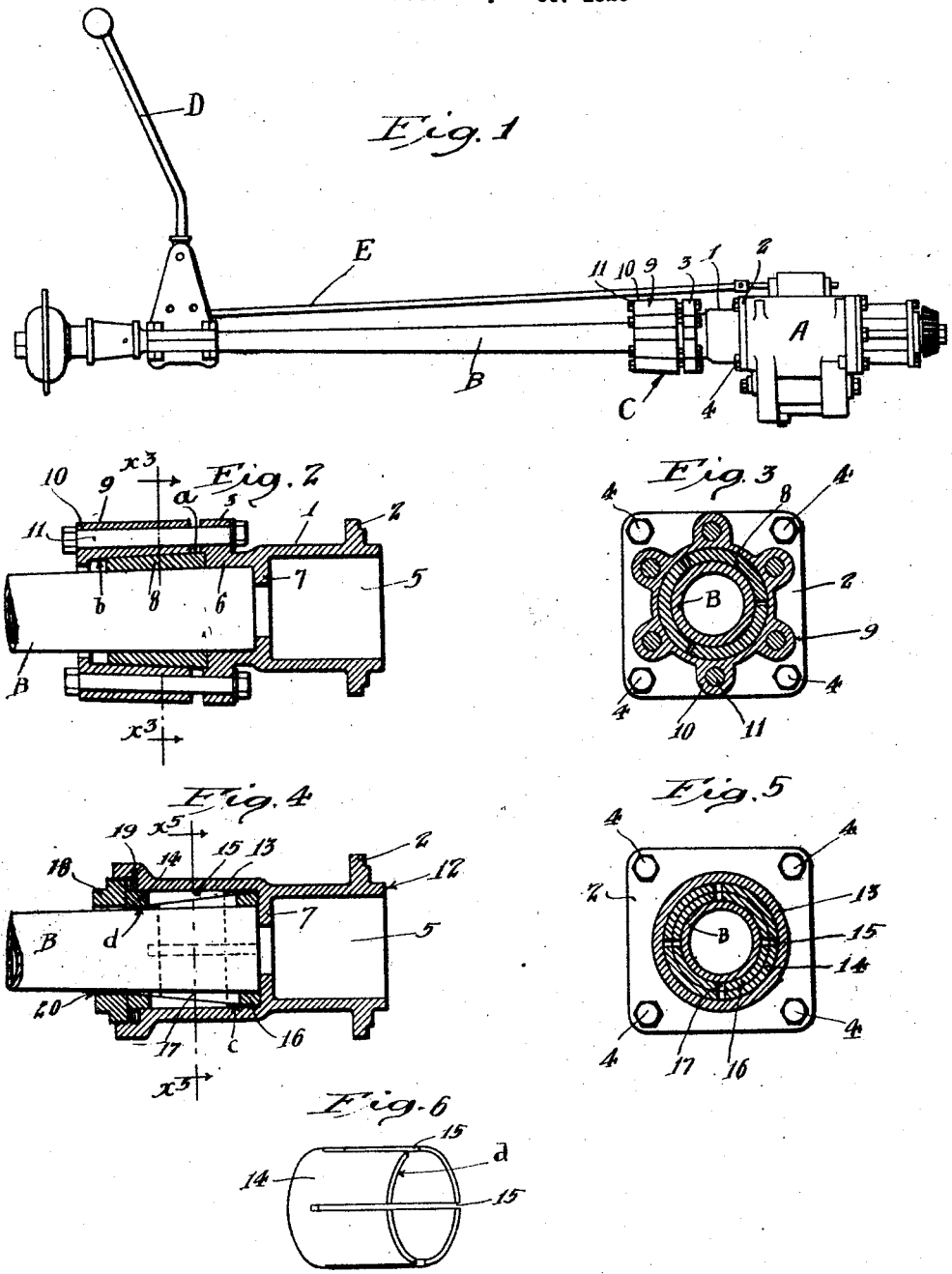

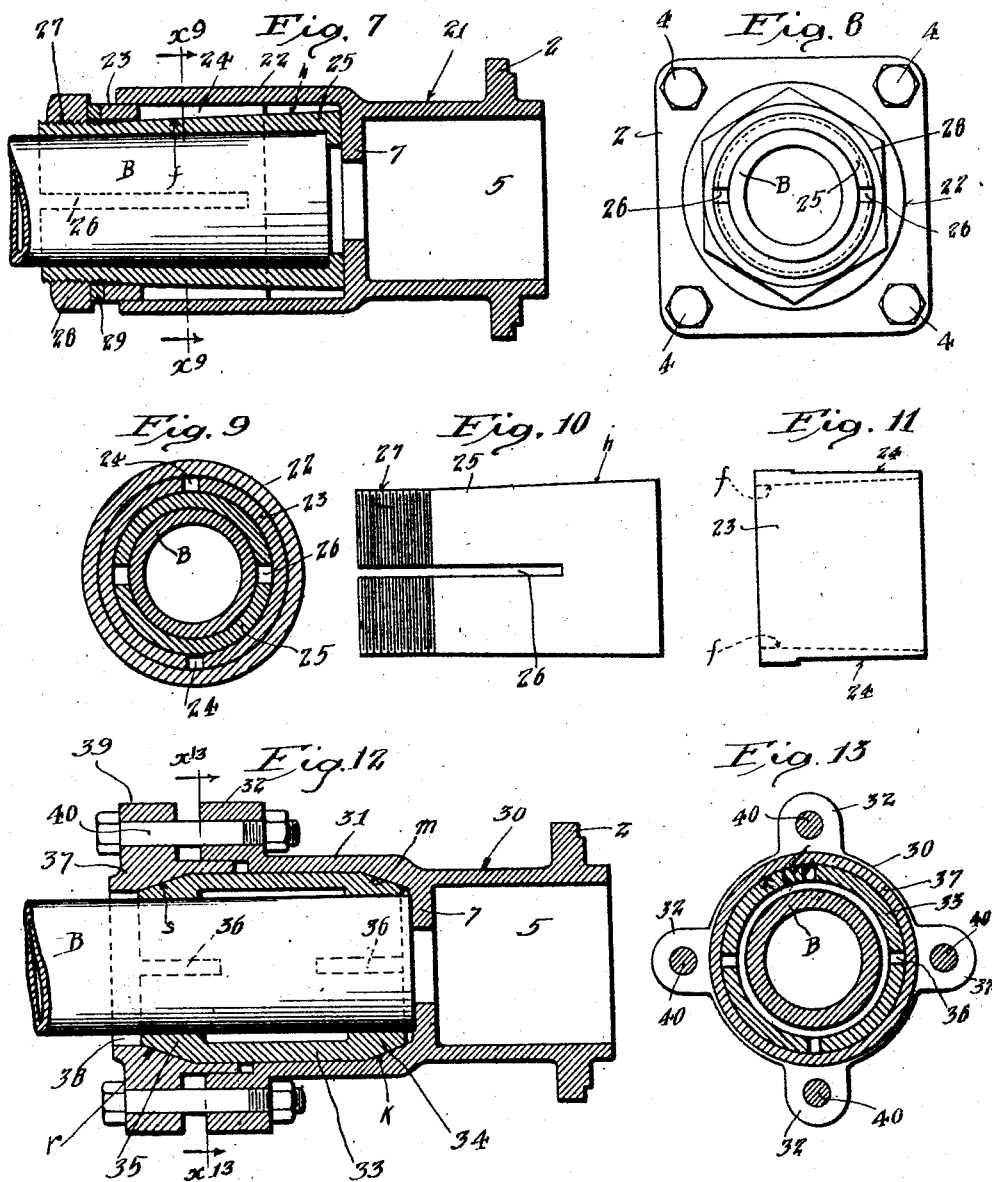

1,545,680

UNITED STATES PATENT OFFICE.

HENRY N. MOORE, OF LOS ANGELES, CALIFORNIA, ASSIGNOR, BY MESNE ASSIGNMENTS, TO ROCKY MOUNTAIN STEEL PRODUCTS, INC., OF LOS ANGELES, CALIFORNIA, A CORPORATION OF CALIFORNIA.

HOUSING COUPLING FOR AUTOMOBILES.

Application filed September 30, 1920. Serial No. 413,666.

*To all whom it may concern:*

Be it known that I, HENRY N. MOORE, a citizen of the United States, residing at Los Angeles, in the county of Los Angeles and State of California, have invented a new and useful Housing Coupling for Automobiles, of which the following is a specification.

In my reissue patent dated Sept. 28, 1920, No. 14,952, I have disclosed a supplemental or auxiliary change speed mechanism between the differential gearing and the usual two-speed transmission mechanism of a well known type of automobile, and in said patent I have provided a split coupling between the housing of the supplemental change speed mechanism and the housing of the drive shaft, said coupling fitting over the rear end of the drive shaft housing and being clamped thereon and being bolted to the housing of the change speed mechanism. To assemble the transmission disclosed in said patent in place in the automobile, portions of the drive shaft housing and the drive shaft will be cut off so as to shorten them, and then the supplemental change speed mechanism will be coupled in position between the drive shaft and the differential gearing.

An object of this invention is to make provision for coupling together the housing of the change speed mechanism and the housing of the drive shaft differently than disclosed in the above mentioned patent.

Another object of this invention is to secure a wedging clamp effect upon the drive shaft housing.

Another object is to effect clamping of the coupling by providing relative endwise movement of two different members of the coupling. In some instances bolts are relied upon to draw said members toward one another, and in other instances nuts or screw-threaded sleeves are provided for this purpose.

Another object of the invention is to provide a rugged coupling and one which is easy to install.

The accompanying drawings illustrate the invention:

Figure 1 is a side elevation of a transmission unit with the invention in place coupling together the housing of a change speed mechanism and the housing of a drive shaft.

Fig. 2 is a longitudinal mid-section of the coupling shown in Fig. 1, a fragment of the drive shaft housing also being shown.

Fig. 3 is a sectional elevation on line indicated by $X^3$—$X^3$ Fig. 2.

Fig. 4 is a longitudinal mid-section of a modified form of coupling, a fragment of the drive shaft housing also being shown.

Fig. 5 is a sectional elevation on line indicated by $X^5$—$X^5$ Fig. 4.

Fig. 6 is a perspective view of the jaw-contracting member in Figs. 4 and 5.

Fig. 7 is a longitudinal mid-section of another modified form of the invention, a fragment of the drive shaft housing also being shown.

Fig. 8 is an end elevation from the left of Fig. 7, the attaching bolts being shown.

Fig. 9 is a sectional elevation on line indicated by $X^9$—$X^9$ Fig. 7.

Fig. 10 is a side elevation of the jaw member shown in Fig. 7.

Fig. 11 is a side elevation of the jaw-contracting member shown in Fig. 7.

Fig. 12 is a longitudinal mid-section of a still different form of the invention, a portion of the shaft housing also being shown.

Fig. 13 is a sectional elevation on line indicated by $X^{13}$—$X^{13}$ Fig. 12.

In Figure 1 is shown change speed mechanism housing A and drive shaft housing B, between which is interposed a coupling indicated in general at C. On the shaft housing is mounted a lever D for shifting an operating rod E which controls the change speed mechanism in the housing A, said change speed mechanism not being visible because of the nature of the view. The foregoing described elements, with the exception of the specific type of coupling C, have been described in detail in the above mentioned patent and are only illustrated and described in general herein in order to make clear how the invention is assembled in place in the automobile.

In Figure 1 the character C is employed to designate any suitable type of coupling though, in reality, it is analogous to that shown in detail in Figs. 2 and 3.

The coupling shown in Figs. 2 and 3 is constructed as follows: There is provided a chambered coupling member 1 having flanges 2 and ears 3, the flange 2 being adapted to be fastened by bolts 4 to the forward end of the housing A. The chamber in the member 1 is indicated at 5 and is adapted to house the roller or other type of bearing, not shown, for journaling the forward shaft of the change speed mechanism.

The forward end of the member 1 forms a sleeve 6, adapted to loosely fit upon the rear end portion of the shaft housing B, there being an internal annular shoulder 7 between the chamber 5 and housing B for the housing B to thrust against. Surrounding the housing B is a set of individual wedge-shape slips or jaws 8, the outer faces $a$ thereof being aslant forwardly and inwardly so as to fit the complementarily slanting inner face $b$ of a jaw-contracting member 9 constructed in the form of a sleeve or ring. The member 9 is provided with ears 10 which are connected by bolts 11 to the ears 3, said bolts constituting adjustable take-up means. When the bolts 11 are tightened up they draw the member 9 toward the member 1, thus forcing the jaws 8 inwardly into clamping engagement with the shaft housing B, the rear ends of the jaws 8 abutting the sleeve 6 so as to prevent rearward movement of the jaws when the bolts 11 are drawn up tight. When the coupling is once securely clamped in position on the housing B, relative endwise movement of the housing and coupling cannot take place because of the shoulder 7 and rearward expansion of the shaft housing B.

The form of coupling shown in Figs. 4, 5 and 6 comprises a chambered coupling member 12, the chamber being indicated by the character 5 as in Fig. 2, also the flange 2 and internal annular shoulder 7 are provided the same as in the construction shown in Fig. 2. The forward end of the coupling member 12 forms a sleeve 13 and inside of said sleeve is a split jaw contracting-member 14 in the form of a slotted sleeve having longitudinal slots 15 and wedge-shape or, in other words, having its inner face $d$ aslant forwardly and inwardly to fit the complementarily slanting outer faces $c$ of split wedge-shape jaw members 16, there being, in this instance, two such jaws each provided with a longitudinal slot 17.

In this instance the jaw contracting member 14 is moved rearwardly, to force the jaws 16 into clamping engagement with the housing B by an internal nut or screw-housing 18 engaging an internal screw-thread 19 in the forward end of the sleeve 13, the inner face of said nut bearing against the outer face of the jaw contracting member 14. The nut 18 is provided with an opening 20 through which the housing B extends.

In the form of the invention shown in Figs. 7 to 11, inclusive, there is provided a chambered coupling member 21 having a chamber 5, flange 2 and internal shoulder 7, the same as in the previously described forms. The forward portion of the member 21 forms a sleeve 22 and inside of said sleeve is a slotted wedge-shape jaw-contracting member 23 in the form of a sleeve. The jaw contracting member 23 is provided with longitudinal slots 24, two in this instance, and the inner face $f$ of said jaw-contracting member is aslant forwardly and inwardly to fit the complementary slanting face $h$ of a ring-shape slotted jaw member 25 the longitudinal slots being indicated at 26.

The outer end of the jaw 25 is provided with external screw-threads 27 engaged by a nut or screw-threaded collar 28 which may be adjusted toward the jaw-contracting member 23 to cause the forward portion of the jaw to grip the shaft housing B. Preferably, however, between the jaw-contracting member 23 and nut 28 will be interposed a washer 29, though such washer is not absolutely essential.

In the form of the invention shown in Figs. 12 and 13, there is provided a chambered member 30 having a chamber 5, flange 2 and internal shoulder 7, the same as previously described herein. The forward portion of the member 30 forms a sleeve 31 provided with ears 32. Inside of the sleeve 31 is a jaw-member 33 split at its end portions to form wedge-shape jaws 34, 35, the slots in the sleeve 33 being indicated at 36 and the outer faces $k$ of the jaws 34 extend aslant rearwardly and inwardly to fit the internal complementary slanting face $m$ of the sleeve 31. Also the outer face $r$ of the jaws 35 extends aslant forwardly and inwardly to fit the internal complementary slanting faces $s$ of a jaw contracting member 37, provided with a central opening 38 to accommodate the housing B. The member 37 is thus in the form of a sleeve. The jaw-contracting member 37 is provided with ears 39 which are connected by bolts 40 to the ears 32. Tightening of the bolts 40 forces the jaw-contracting member 37 endwise toward the sleeve 31 so as to compress the end portions or jaws of the sleeve 33 tightly upon the shaft housing B.

From the foregoing it will be clear that the members 8, 16, 25 and 33 constitute contractile means for clamping the housing B, and that the bolts 11, 40 and nuts 18, 28 constitute adjustable means for moving the jaw-contracting members 9, 37, 14, 23 respectively, longitudinally to wedge the contractile means upon the housing B. It is probable that other forms of the invention could be made without departing from the spirit and scope of the invention as defined in the appended claims.

I claim:

1. A coupling of the character described comprising a tubular member constructed for securing at one end to a housing and constructed at said end to hold a bearing for a shaft, the other end of the tubular member forming a sleeve, a slotted wedge-shape jaw-contracting member in the sleeve having its inner face aslant outwardly toward the bearing, a ring-shape slotted jaw member extending through the jaw-contracting member and having a slanting outer face complementary to the slanting face of the jaw-contracting member, and means to force the jaw-contracting member toward the bearing to contract the jaw member.

2. A coupling of the character described comprising a tubular member constructed for securing at one end to a housing and constructed at said end to hold a bearing for a shaft, the other end of the tubular member forming a sleeve, a slotted wedge-shape jaw-contracting member in the sleeve having its inner face aslant outwardly toward the bearing, a ring-shape slotted jaw member extending through the jaw-contracting member and having a slanting outer face complementary to the slanting face of the jaw-contracting member, the jaw member having screw-threads, and a nut engaging the screw threads and bearing against one end of the jaw contracting member to contract the jaw member.

Signed at Los Angeles, California, this 9th day of September 1920.

HENRY N. MOORE.

Witnesses:
GEORGE H. HILES,
L. BELLE WEAVER.